(12) United States Patent
Luther

(10) Patent No.: US 6,540,224 B2
(45) Date of Patent: Apr. 1, 2003

(54) TORQUE SOFT SHEET PATH ASSEMBLY WITH STIFFENING MEMBER

(75) Inventor: Richard G. Luther, Hamlin, NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/860,178

(22) Filed: May 17, 2001

(65) Prior Publication Data

US 2001/0042957 A1 Nov. 22, 2001

Related U.S. Application Data

(60) Provisional application No. 60/204,827, filed on May 17, 2000.

(51) Int. Cl.[7] .............................................. B65H 29/00
(52) U.S. Cl. ..................... 271/184; 271/273; 271/264
(58) Field of Search ................................. 271/264, 273, 271/186, 184; 193/2 R

(56) References Cited

U.S. PATENT DOCUMENTS

| 3,661,383 A | * | 5/1972 | Morrison ..................... 271/273 |
| 4,477,068 A | | 10/1984 | Arter et al. |
| 5,205,551 A | * | 4/1993 | Nagano et al. .......... 198/463.4 |
| 5,236,339 A | | 8/1993 | Nishiumi et al. |
| 5,431,389 A | | 7/1995 | Wensink et al. |
| 5,842,692 A | * | 12/1998 | Rutishauser ................. 271/186 |
| 5,979,893 A | * | 11/1999 | Mou et al. ................... 271/273 |
| 6,073,927 A | * | 6/2000 | Sako et al. ................. 271/186 |
| 6,092,449 A | * | 7/2000 | Ward et al. ................ 83/155.1 |
| 6,145,828 A | | 11/2000 | Arai |
| 6,151,140 A | * | 11/2000 | Wilcox et a. ............ 271/10.11 |
| 6,206,368 B1 | | 3/2001 | Kobayashi et al. |
| 6,336,629 B1 | * | 1/2002 | Carter et al. ................ 271/274 |

OTHER PUBLICATIONS

International Search Report, International application No. PCT/US01/15651 including cited references included herewith and listed on p. 1 above (US 4,477,068; US 5,236,339; US 5,431,389; US 6,145,828 and US 6,206,368).

* cited by examiner

Primary Examiner—Christopher P. Ellis
Assistant Examiner—Richard Ridley

(57) ABSTRACT

A sheet path assembly having two mating components which are pivotally attached to one another so that they may be opened in the case of a sheet jam. One of the mating assemblies is a turnover component, which is torsionally weak about an axis in the direction of the sheet path. This is done so that the turnover component will conform to the mating component when they close. A stiffening member is mounted to the turnover component, such that when the stiffening member is engaged, the turnover component is then torsionally stiff. When the turnover component is conformed to the mating assembly, the stiffening member is engaged, locking the turnover component into the conforming position.

20 Claims, 5 Drawing Sheets

TORQUE SOFT SHEET PATH ASSEMBLY WITH STIFFENING MEMBER

This application claims the benefit of U.S. Provisional Application No. 60/204,827, filed May 17, 2000.

BACKGROUND

The present invention relates to the field of copiers and scanners, and is particularly useful for digital electrographic machines.

In sheet path assemblies consisting of mating assemblies which open on a pivot and close on two points, it is often difficult for the mating assemblies to close properly due to the tolerances in the manufacturing process. It is common to allow the assemblies a degree of rotational freedom about an axis parallel to the sheet path, so that they can close fully. This is referred to as being torsionally weak. In some cases, allowing the assembly to be torsionally weak is not desirable from a functional as well as a customer perception standpoint.

A sheet path assembly is desired which will close fully in spite of the tolerances in the manufacturing process, but will not be torsionally weak during operation.

SUMMARY OF THE INVENTION

According to a aspect of the invention, a sheet path assembly is provided comprising a sheet path component that is torsionally weak about an axis, a mating component that contacts the sheet path component, wherein the sheet path component is pivotally attached to the mating component, and a stiffening member mounted on the sheet path component in a manner that torsionally stiffens the sheet path component about the axis in conformance with the mating component.

According to a further aspect of the invention, a method of assembling a sheet path assembly is provided comprising pivotally mounting a sheet path component that is torsionally weak about an axis to a mating component, closing the sheet path component onto the mating component, such that the sheet path component contacts and conforms to the mating component; and locking the sheet path component in conformance with the mating component with a stiffening member that torsionally stiffens the sheet path component about the axis.

According to a still further aspect of the invention, a sheet path assembly is provided comprising a torsionally weak turnover component having an input end and an opposing output end, and having a longitudinal end one and an opposing longitudinal end two, wherein the torsionally weak turnover component is torsionally weak about the turnover component's torsionally weak axis, wherein the torsionally weak axis is an axis from the input end to the output end and centered between the turnover component's longitudinal end one and longitudinal end two a mating component with a turnover component mounting point, wherein the torsionally weak turnover component input end is pivotally attached to the mating component at the turnover component mounting point, and a stiffening member mounted on the torsionally weak turnover component such that when the stiffening member is engaged, the torsionally weak turnover component becomes torsionally stiff about the torsionally weak axis.

DETAILED DESCRIPTION

Figure 1:
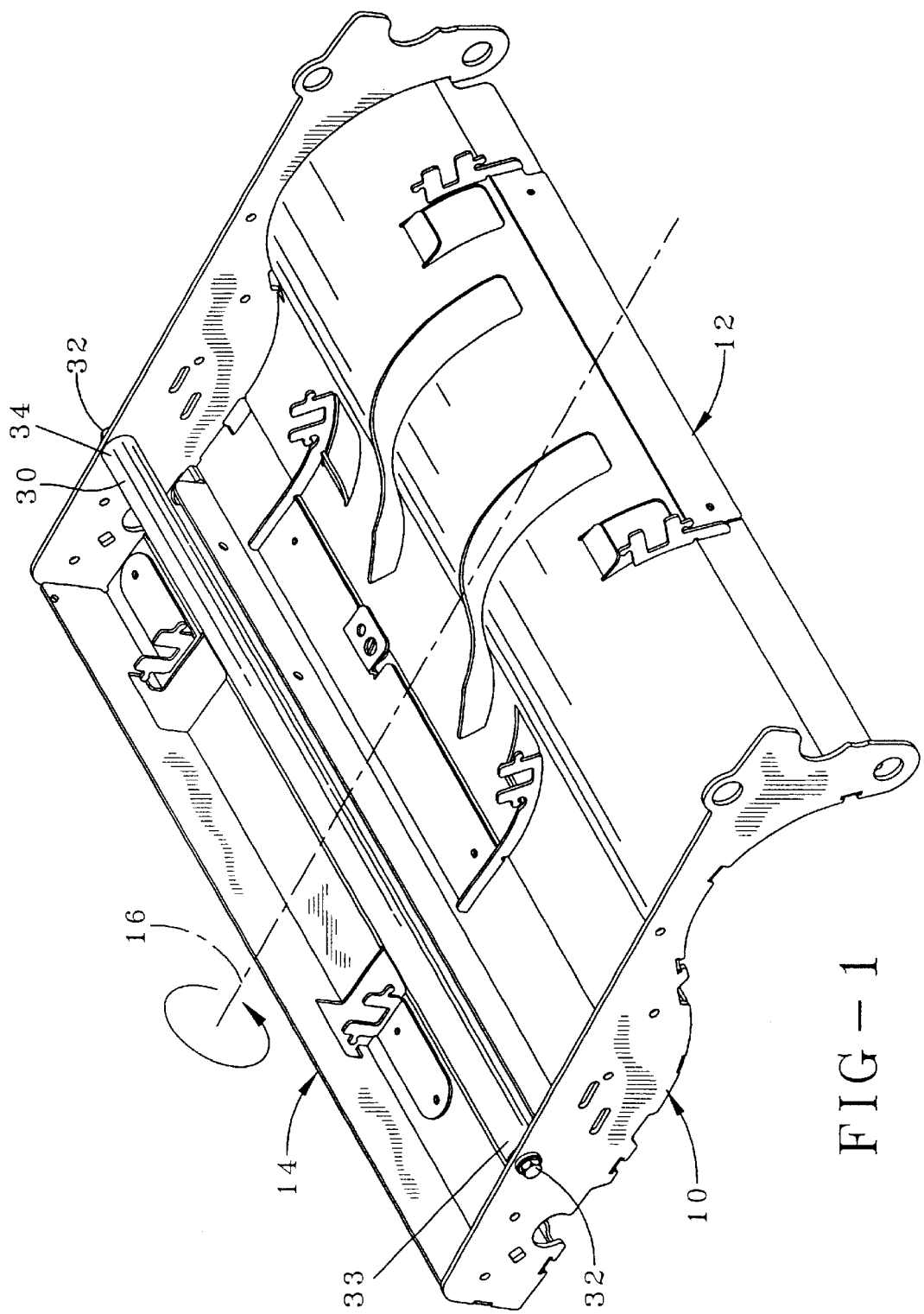
FIG. 1 is an isometric view of a torsionally weak turnover assembly according to an aspect of the invention.
Figure 2:
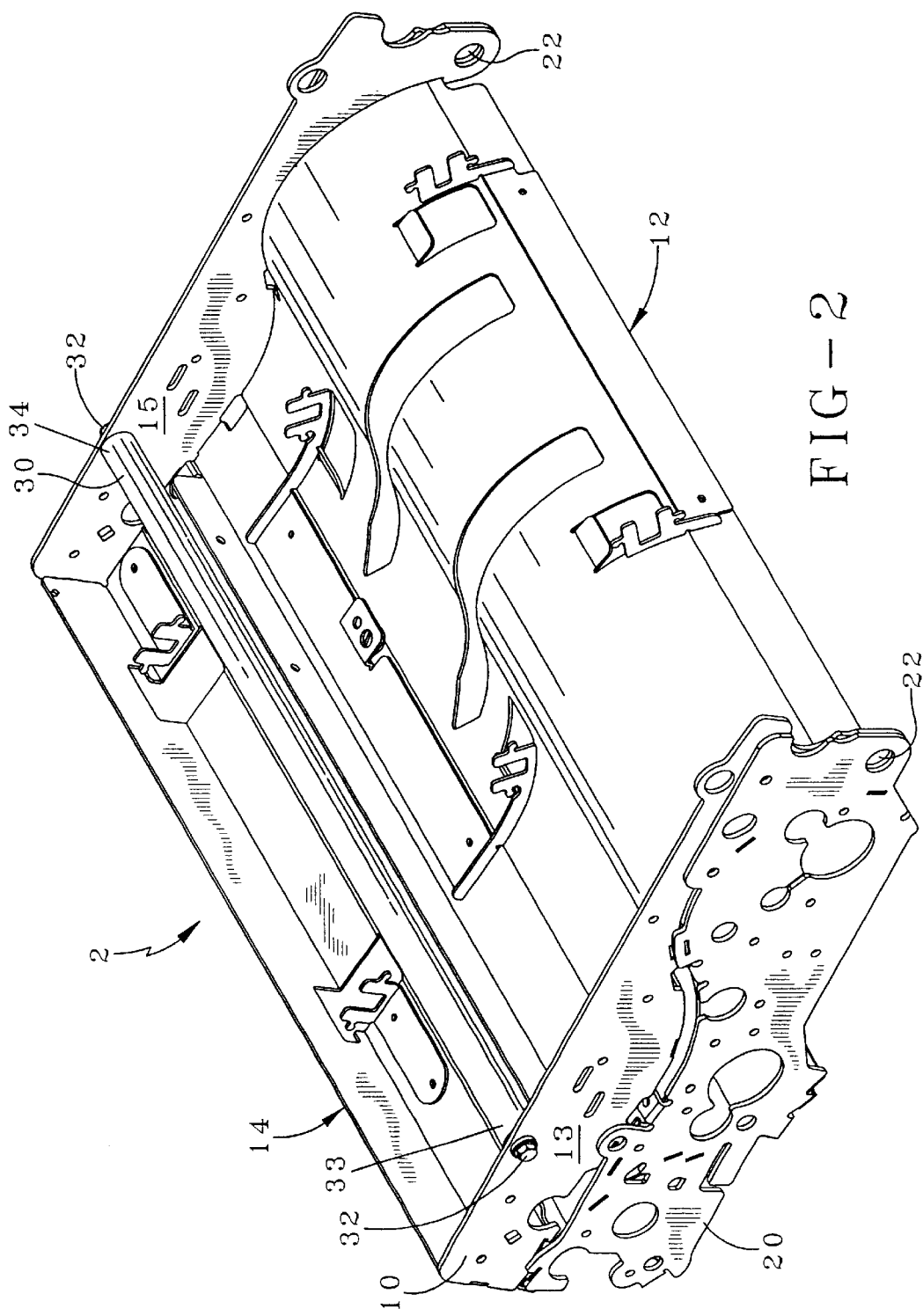
FIG. 2 is an isometric view of a closed sheet path assembly according to an aspect of the invention.
Figure 3:
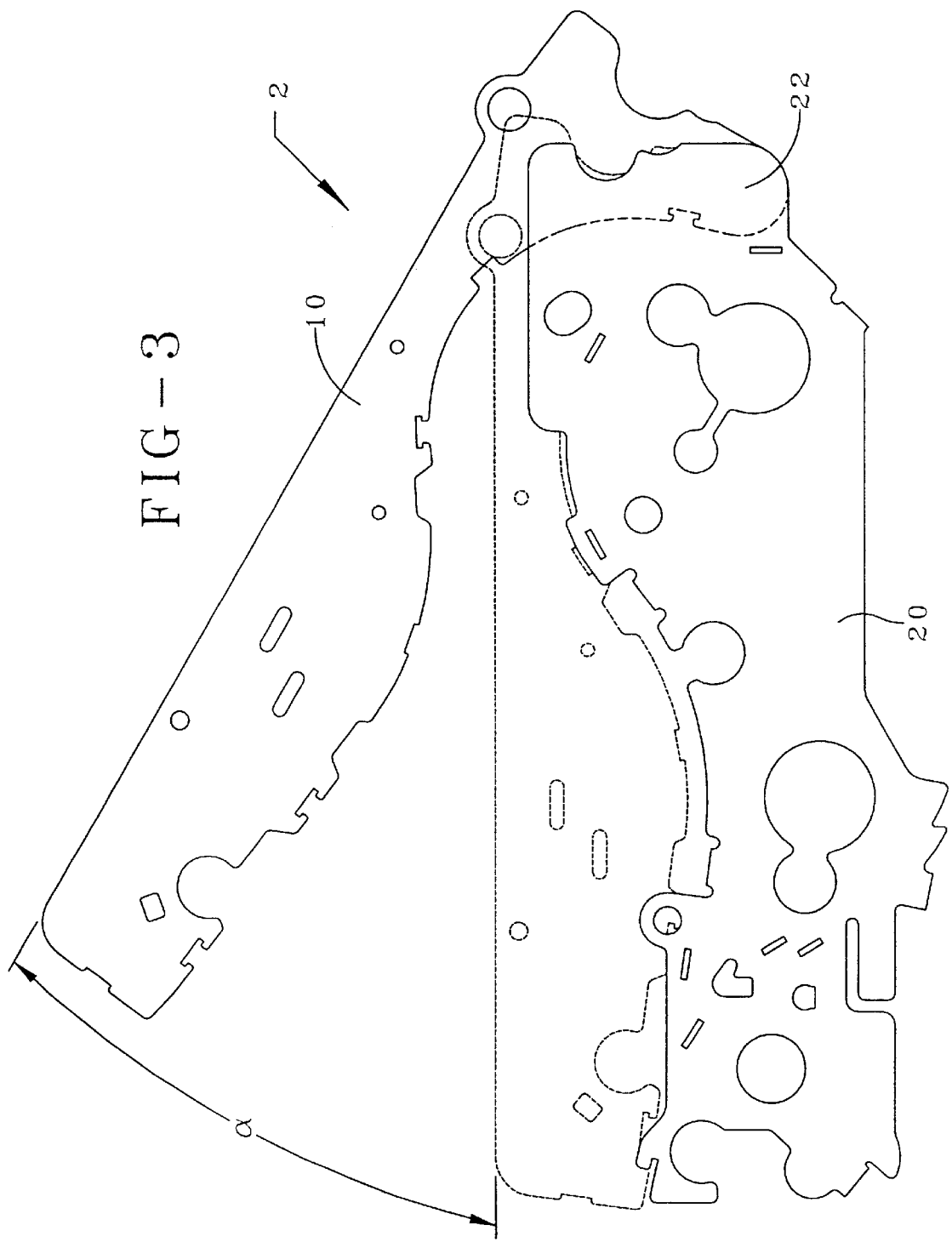
FIG. 3 is a side view of an open sheet path assembly according to an aspect of the invention.

Various aspects of the invention are presented in FIGS. 1–4 which are not drawn to scale and in which like components are numbered alike. Referring now to FIG. 2, according to an aspect of the invention a sheet path assembly 2 is shown. As described herein, the sheet path assembly 2 is a turnover assembly for an optical scanner, implemented for example in the scanning of duplex documents, although the invention is not limited in such manner. The sheet path assembly 2 comprises a torsionally weak sheet path component 10, a mating component 20, and a stiffening member 30. Referring now to FIGS. 1 and 2, the sheet path component 10 has a longitudinal end one 13 and an opposing longitudinal end 15, an input end 12 and an opposing output end 14, wherein the sheet path flows from the input end 12 to the output end 14. The sheet path component 10 is torsionally weak about an axis 16. According to a preferred embodiment, the axis 16 is in the direction of the sheet path and centered between the turnover assembly's longitudinal end one 13 and end two 15.

Figure 5:
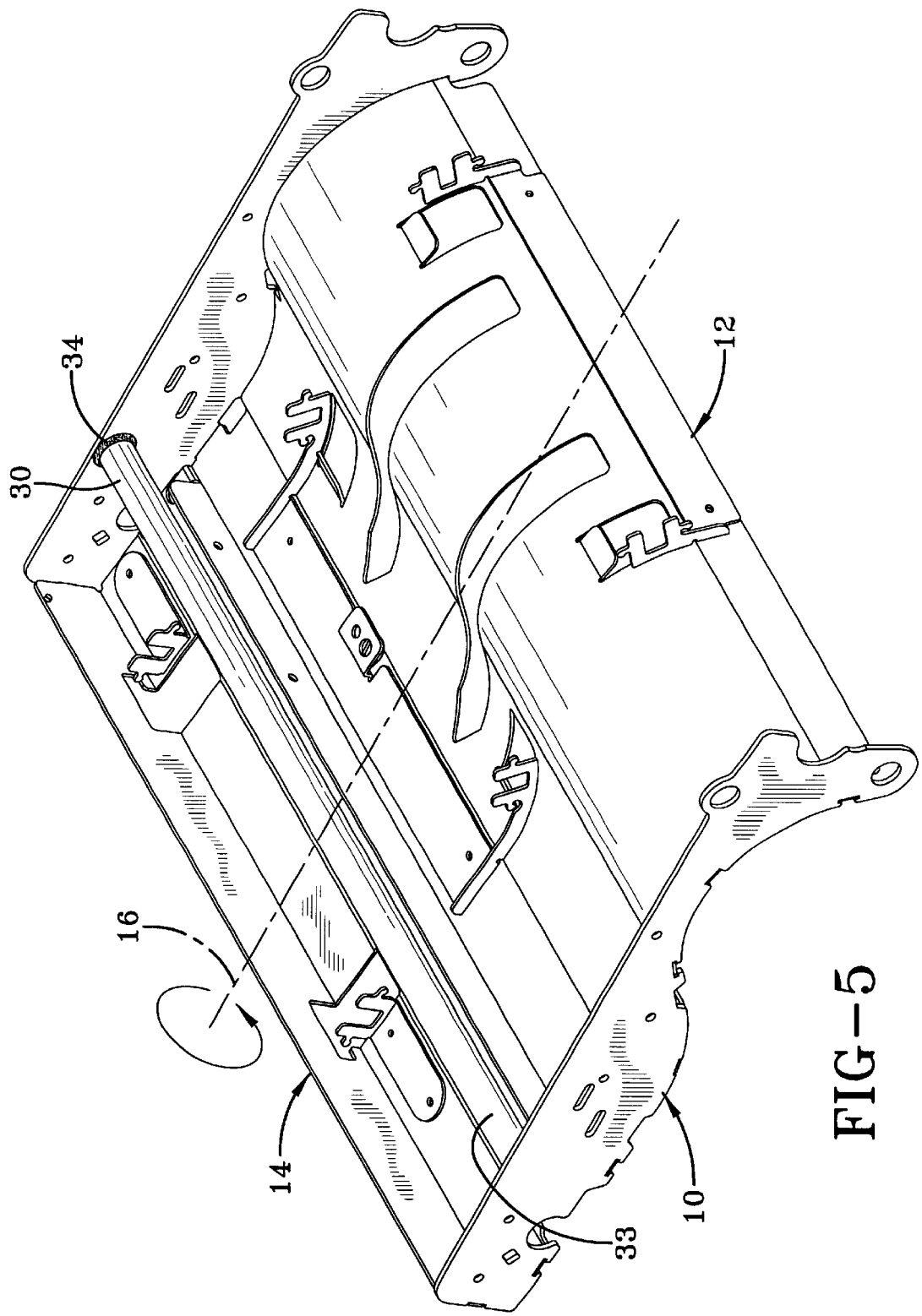
FIG. 5 is an isometric view of a torsionally weak turnover assembly with an integral stiffening member, according to an aspect of the invention.

The mating component 20 has a mounting point 22. The sheet path component input end 12 is pivotally attached to the mating component 20 at the mounting point 22. The stiffening member 30 is mounted on the sheet path component 10 such that when the stiffening member 30 is engaged, the sheet path component 10 becomes torsionally stiff about the torsionally weak axis 16. In further embodiments of the invention, the stiffening member 30 may or may not be an integral part of the sheet path component 10, see FIGS. 5 and 1 respectively.

In a preferred embodiment of the invention, the stiffening member 30 comprises a bar having opposing ends, end one 33 and end two 34, mounted perpendicularly to the turnover assembly's torsionally weak axis 16. In a further preferred embodiment the bar is mounted by screwing stiffening member end one 33 into the sheet path component's end one 13, and screwing stiffening member end two 34 into the sheet path component's end two 15, and the stiffening member 30 is engaged by tightening the screws 32.

A further aspect of the invention is a method of assembling a sheet path assembly 2. This method comprises the steps of pivotally mounting a sheet path component 10 having an input end 12 and an opposing output end 14, to a mating component 20 having a mounting point 22. The input end 12 may be pivotally mounted at the mounting point 22. A further step is to close the sheet path component 10 onto the mating component 20, such that the sheet path component 10 contacts and conforms to the mating component 20. The final step is locking the sheet path component 10 into the conformed torsional position with a stiffening member 30 mounted on the sheet path component 10 such that when the stiffening member 30 is engaged, the sheet path component 10 is torsionally stiff about the torsionally weak axis 16.

In a preferred embodiment of this invention, the stiffening member 30 comprises a bar perpendicular to axis 16, which when so mounted spans the width of the torsionally weak turnover assembly 10. The bar may be mounted by screwing both ends of the bar into the sheet path component 10, and the stiffening member 30 is engaged by tightening the screws 32.

Figure 4:
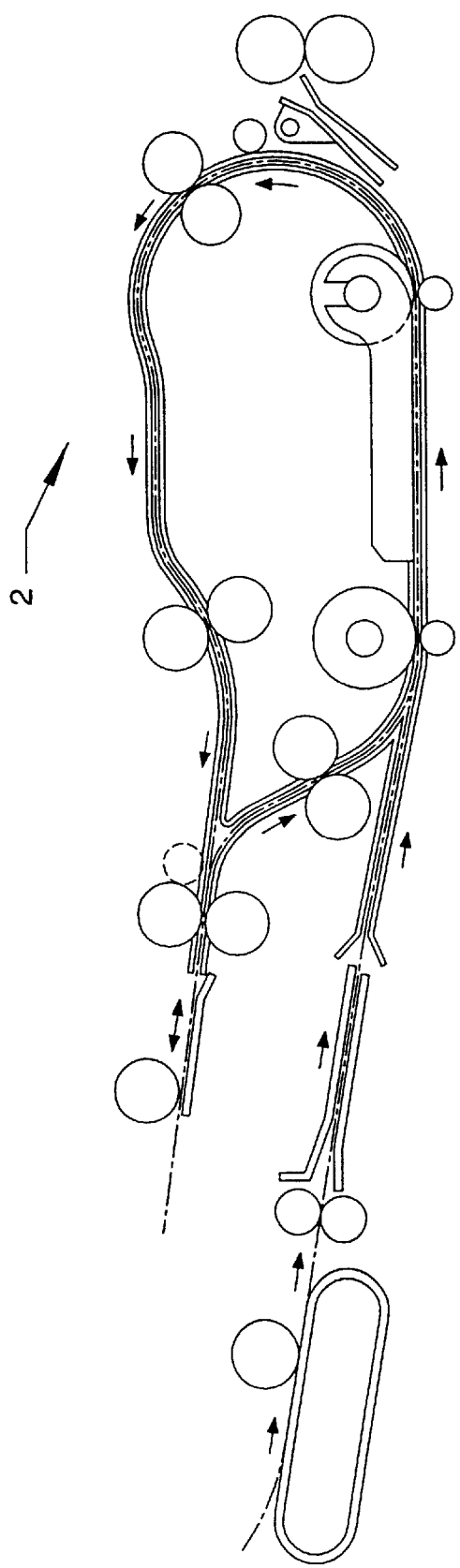
FIG. 4 is a side view of a typical sheet path for a digital scanner.

Although described in relation to a turnover assembly, reproduction machines generally have numerous sheet path components, and the invention is useful for any such components that comprise articulating and mating components. As used herein the term "sheet" is intended to broadly refer to original documents and recording media. The invention is useful in the sheet paths of various types of reproduction machines, including optical scanners and electrographic printers. Examples include, without limitation, digital optical scanners and electrostatographic printers (as used herein, the term "printers" includes copiers). Referring to FIG. 4, a side view of a recirculating document path for an optical scanner is presented, the general location of the turnover assembly 2 being indicated.

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

What is claimed is:

1. A sheet path assembly comprising:
   a sheet path component that is torsionally weak about an axis;
   a mating component opposite said sheet path component, wherein said sheet path component is pivotally attached to said mating component; and,
   a stiffening member mounted on said sheet path component in a manner that torsionally stiffens said sheet path component about said axis in conformance with said mating component.

2. The sheet path assembly of claim 1 wherein said stiffening member is an integral part of said sheet path component.

3. The sheet path assembly of claim 1 wherein said stiffening member is not an integral part of said sheet path component.

4. The sheet path assembly of claim 1 wherein said stiffening member is perpendicular to said axis.

5. The sheet path assembly of claim 1 wherein said stiffening member comprises a bar perpendicular to said axis and screws, wherein said bar is mounted to said sheet path component by said screws.

6. The sheet path assembly of claim 1 wherein said sheet path component is a component of a turnover assembly.

7. The sheet path assembly of claim 1, wherein said sheet path component has an input end and an opposing output end, and having a longitudinal end one and an opposing longitudinal end two, said axis extending from said input end to said output end.

8. The sheet path assembly of claim 7, wherein said sheet path component comprises a longitudinal end one and an opposing longitudinal end two, and said axis is centered between said longitudinal end one and said longitudinal end two.

9. The sheet path assembly of claim 1 wherein said mating component is rigid.

10. The sheet path assembly of claim 1 that is part of an optical scanner.

11. The sheet path assembly of claim 1 that is part of an electrograhic printer.

12. A method of assembling a sheet path assembly comprising:
    pivotally mounting a sheet path component that is torsionally weak about an axis to a mating component;
    closing said sheet path component onto said mating component, such that said sheet path component conforms to said mating component; and,
    locking said sheet path component in conformance with said mating component with a stiffening member that torsionally stiffens said sheet path component about said axis.

13. The method of claim 12 wherein said stiffening member is an integral part of said sheet path component.

14. The method of claim 12 wherein said stiffening member is not an integral part of said sheet path component.

15. The method of claim 12 wherein said stiffening member comprises a bar perpendicular to said axis and further comprising mounting said bar to said sheet path component with screws.

16. The method of claim 12 further comprising assembling said said sheet path assembly as part of a turnover assembly.

17. The method of claim 12, wherein said mating component is rigid.

18. The method of claim 12, further comprising assembling said sheet path assembly as part of an optical scanner.

19. The method of claim 12, further comprising assembling said sheet path assembly as part of an electrographic printer.

20. A sheet path assembly comprising:
    a torsionally weak turnover component having an input end and an opposing output end, and having a longitudinal end one and an opposing longitudinal end two, wherein said torsionally weak turnover component is torsionally weak about said turnover component's torsionally weak axis, wherein said torsionally weak axis is an axis from said input end to said output end and centered between the turnover component's longitudinal end one and longitudinal end two;
    a mating component with a turnover component mounting point, wherein said torsionally weak turnover component input end is pivotally attached to said mating component at said turnover component mounting point; and,
    a stiffening member mounted on said torsionally weak turnover component such that when said stiffening member is engaged, said torsionally weak turnover component becomes torsionally stiff about said torsionally weak axis.

* * * * *